US 6,955,706 B2

(12) United States Patent
Varrin, Jr. et al.

(10) Patent No.: US 6,955,706 B2
(45) Date of Patent: Oct. 18, 2005

(54) LIQUID DEGASSING SYSTEM FOR POWER PLANT SYSTEM LAYUP

(75) Inventors: Robert D Varrin, Jr., Reston, VA (US); Sotaro Kaneda, Hokkaido (JP)

(73) Assignee: Dominion Engineering INC, Reston, VA (US)

( * ) Notice: Subject to any disclaimer, the term of this patent is extended or adjusted under 35 U.S.C. 154(b) by 162 days.

(21) Appl. No.: 10/408,781

(22) Filed: Apr. 8, 2003

(65) Prior Publication Data

US 2004/0025696 A1 Feb. 12, 2004

Related U.S. Application Data

(60) Provisional application No. 60/370,240, filed on Apr. 8, 2002.

(51) Int. Cl.[7] .............................................. B01D 19/00
(52) U.S. Cl. ................. 95/46; 95/247; 95/266; 95/8; 96/6; 96/193; 122/491
(58) Field of Search ................................ 95/8, 46, 247, 95/266; 96/6, 7, 193; 122/491, 34, 459

(56) References Cited

U.S. PATENT DOCUMENTS

| 4,182,277 | A | * | 1/1980 | Burton et al. | 122/491 |
| 4,556,492 | A | * | 12/1985 | Dickerson et al. | 210/668 |
| 4,818,411 | A | * | 4/1989 | Dickerson et al. | 210/668 |
| 5,422,013 | A | * | 6/1995 | Hirofuji | 210/739 |
| 5,584,914 | A | * | 12/1996 | Senoo et al. | 96/6 |
| 6,217,634 | B1 | * | 4/2001 | Dominelli et al. | 95/46 |

* cited by examiner

Primary Examiner—Duane Smith
Assistant Examiner—Douglas J. Theisen
(74) Attorney, Agent, or Firm—Pillsbury Winthrop Shaw Pittman LLP

(57) ABSTRACT

A system for producing and maintaining high purity degassed layup water for use in a power plant system during a layup period is disclosed. The liquid degassing system includes a degassing assembly for removing a predetermined amount of the undesired gases under vacuum pressure from the layup solution such that the amount of desired gases within the layup solution remains at or below standard values.

22 Claims, 2 Drawing Sheets

LIQUID DEGASSING SYSTEM FOR POWER PLANT SYSTEM LAYUP

CROSS REFERENCE TO RELATED APPLICATIONS

This application claims priority to U.S. Provisional Patent Application No. 60/370,240, which was filed on Apr. 8, 2002.

BACKGROUND OF THE INVENTION

1. Field of the Invention

The present invention relates to a system for producing and maintaining high purity degassed water for use in the layup or filling of nuclear power plant systems during periods of plant shutdown. The use of degassed water prevents oxidation of plant components or deposits. The degassing capability of the present invention allows operators of nuclear power plants to improve overall plant system integrity by reducing the potential for oxidation of secondary surfaces of plant components or existing deposits. This is accomplished by continuously or periodically removing oxygen and other potentially damaging gases from the layup water solution without extracting or removing the layup chemicals, such as, for example, ammonia, morpholine or DMA.

2. Description of Related Art

Electric generating stations or power plants are routinely shut down to complete routine inspection and maintenance tasks that cannot be performed during normal operation. During these periods of shutdown or outages, the plant systems are placed in various layup states, which are designed to prevent corrosion of the plant component surfaces upon exposure to air or oxygenated water. To accomplish this task, layup solutions are prepared and added to the plant systems. The use of layup solutions creates a wet layup state.

There are numerous options for wet layup solutions. For example, water at an elevated pH (typically 8.5 to 10.5 by ammonia or other amine) or water laden with an oxygen scavenger such as hydrazine or hydrazine-hydroquinone/quinhydrone (so called catalyzed hydrazine) may be used. Alternatively, deoxygenated water can be added to the plant systems. The systems are then inerted using nitrogen. Typically, the deoxygenated layup water is prepared in a special plant system employing vacuum degassing techniques, nitrogen sparging and blanketing of supply tanks, or by chemical treatment systems as disclosed, for example, in U.S. Pat. Nos. 4,818,411 and 4,556,492. In some instances, secondary system components of the power plant are placed in a "dry layup" state by passing dehumidified air through the system components. This leads to dry out and cessation of any ongoing oxidation.

In pressurized water reactor nuclear power plants, the need for prevention of the corrosion or oxidation of plant systems during layup is particularly important. The presence of oxidized species arising from improper layup states increases the risk of component corrosion during periods of subsequent operation. For example, there is a concern of steam generator tube corrosion, which could arise if the steam generator, feedwater, condensate and drain system surfaces or their overlying corrosion protection layers become oxidized during outages. These oxidized species introduce the possibility of higher electrochemical potentials in the steam generators during subsequent operation. Specifically, the formation of oxidized iron species such as hematite from the ever-present but benign magnetite deposits, and oxidized copper species such as cuprite ($Cu_2O$) and tenorite (CuO) could promote intergranular attack or stress corrosion cracking of the nickel alloy steam generator tubes. These tubes not only serve as the surfaces through which heat from the reactor is transferred to the secondary plant, but also represent a boundary between the radioactive primary system and the non-radioactive secondary system. Breaches in this boundary due to corrosion increase the risk of exposure by the plant staff and public to unacceptable levels of radioactivity.

A number of industry guidelines have been established regarding recommended practices for steam generator wet layup (see, e.g., for example, EPRI Report TR-112967 "Source Book on Limiting Exposure to Startup Oxidants"). The recommendations contained in these guidelines typically focus on: (1) using low oxygen fill water, (2) maintaining non-oxidizing conditions, (3) maintaining strongly reducing conditions, (4) performing remedial "hot soaks" or conditioning steps during startup to reduce any oxidized species that may have formed during the outage. Each of these approaches has some limitations or disadvantages.

First, a supply of deoxygenated fill water is typically not a problem at a given power plant, but experience suggests that once a system is partially filled, the liquid will tend to gradually absorb oxygen from air whenever free surfaces are available. Second, the general approach to maintaining non-oxidizing (reducing) conditions is to raise the pH of the water and add an oxygen scavenger such as hydrazine. Unfortunately, recent tests have demonstrated that even at elevated pH, and with hydrazine present, copper in stream generator deposits can undergo conversions as high as 0.25% in five days at ambient temperature, as reported in EPRI Report TR-1001204 "Oxidation and Reduction of Copper in Steam Generator Deposits," September 2001. Lab test data has demonstrated that significant increases in electrochemical potential, and therefore corrosion can occur with as little as 0.1% copper oxides, as reported in EPRI Report NP-6721-SD "Corrosion Evaluation of Thermally Treated Alloy 600 Tubing in Primary and Faulted Secondary Side Environments." Consequently, even under the best conditions, wet layup of pressure water reactor steam generators can increase risk of tube corrosion and therefore boundary leakage.

The ability to maintain both low oxygen content and strong reducing conditions during layup is beneficial. One method involves sparging the steam generators with nitrogen after addition of wet layup chemicals to displace any oxygen that is absorbed. While this approach is effective, it suffers from three disadvantages. First, plant nitrogen systems are not always available due to the need to also perform maintenance on these systems during the outage. In these cases, a portable nitrogen system including a nitrogen tanker and evaporator must be brought to the site. Second, sparging with nitrogen displaces oxygen in the upper part of the steam generator. This renders the upper region of the steam generator (or open volumes in any plant system under layup) inhabitable due to risk of asphyxiation. Consequently certain secondary side maintenance activities cannot be completed in parallel with the layup. Third, the nitrogen sparging is effective at displacing oxygen in the tube bundle of the generator, but the annulus region of the generator may still be subject to absorption of oxygen.

To maintain the necessary low oxygen levels in the layup water (typically less than 200 ppb oxygen but preferably less than 50 ppb oxygen), the water can be treated on a continuous or semi-continuous basis. These treatment strategies include the use of catalyzed hydrazine, hydrazine-activated carbon beds followed by filtration and resin treatment, and vacuum degassing of the entire system. While each is a potential solution to the problem of oxygenation of the water, none has proven to be effective or practicable. For instance, the addition of catalyzed hydrazine is more effective than hydrazine alone at typical layup temperatures (ambient), but it is costly and not proven to be effective for the prevention of deposit oxidation.

The use of a system employing hydrazine-carbon-resin beds as a means of generating deoxygenated water is discussed extensively in U.S. Pat. No. 4,818,411. Incorporating such a system, however, into a recirculation system attached to a steam generator or other secondary plan system such as the condenser or feedwater heater train would result in removal of beneficial chemical additives such as ammonia, morpholine, ETA or DMA (these amines are used to increase the water pH in accordance with the goal of maintaining reducing conditions and lowering oxidation rates for both copper and magnetite). Finally, vacuum degassing can in principal be achieved, but requires complete isolation of a system, which is not designed for vacuum operation. Vacuum degassing system pumps are also quite large and unwieldy, and would be difficult to deploy inside the tight confines of a pressure water reactor containment. Also, the process of vacuum degassing can be quite slow if the depth of the vessel is large, which often occurs when a large vertical steam generator is in layup (10 meters depth or more).

An obvious benefit would therefore be realized if a system were available for maintaining the dissolved oxygen concentration in the layup water at low levels without removing beneficial additives.

OBJECTS OF THE INVENTION

It is an object of the present invention to provide a system for degassing layup water solutions to remove oxygen and other undesired gases for use during a layup period of power plant systems, including steam generating systems and nuclear power plant systems.

It is another object of the present invention to provide a system for continuously degassing the layup water solution to remove oxygen for use during the layup period.

It is another object of the present invention to provide a system for periodically degassing the layup water solution to remove oxygen for use during the layup period.

It is another object of the present invention to provide a system for degassing the layup water solution to remove oxygen without the use of chemicals employed in the prior art.

It is another object of the present invention to provide a system for degassing the layup water solution by applying vacuum pressure to a hollow fiber membrane to remove the undesired gas from the layup water solution.

It is another object of the present invention to provide a system for degassing the layup water solution to remove oxygen without the consumption or regeneration of resins or charcoal employed in the prior art.

It is yet another object of the present invention to provide a system for degassing the layout water solution that controls the oxygen concentration in the recirculated layup water solution by adjusting a vacuum level applied to one side of at least one degassing filter.

It is yet another object of the present invention to provide a system for degassing the layup water solution that controls the oxygen and undesired gas concentration in recirculated water by adjusting a vacuum level applied to one side of at least one degassing module.

It is another object of the present invention to provide a system for degassing the layup water solution that can be located in existing power plant layup systems.

It is another object of the present invention to provide a system for degassing the layup water solution that is capable of removing the layup water solution from either an upper portion of a steam generator or a lower portion of the steam generator. When the layup water solution is removed from the upper portion of the steam generator, the degassed layup water solution is returned to the steam portion through a lower portion thereof. When the layup water solution is removed from the lower portion of the steam generator, the degassed layup water solution is returned to the steam portion through an upper portion thereof.

It is another object of the present invention to provide a system for degassing the layup water solution having a plurality of degassing modules for removing oxygen from the layup water solution.

It is yet another object of the present invention to provide a system for filtering the layup water solution. It is contemplated that the system for filtering includes a plurality of resin beds in series or parallel with degassing modules.

It is another object of the present invention to provide a system for the chemical clean-up of the layup water. It is contemplated that the clean-up system for filtering includes a plurality of resin beds in series or parallel with degassing modules.

It is another object of the present invention to provide an assembly for easily monitoring the chemistry of the layup water solution.

It is another object of the present invention to provide an assembly for adding chemicals to the layup water solution.

It is another object of the present invention to provide a system for maintaining the dissolved oxygen concentration in the layup water at low levels without removing beneficial additives.

SUMMARY OF THE INVENTION

In response to the foregoing challenges, applicants have developed a system for producing and maintaining high purity degassed layup water for use in a power plant system during a layup period. The system solves the above-described problems associated with the prior art.

Applicants have developed a liquid degassing system for use during a layup operation of a power plant to remove undesired gases, including but not limited to oxygen, from a layup solution during the layup operation. Removal of the undesired gases limits exposure of the plant components to a potentially corrosive environment. The supply of the layup solution is recirculated through at least one plant component during the layup operation. In accordance with the present invention, the liquid degassing system includes an intake assembly for removing the layup water from the desired power plant component (e.g., a steam generator). The intake assembly may remove the layup solution from either the upper portion of the power plant component or the lower power plant component. The intake assembly may include a pumping assembly for withdrawing the layup solution from the power plant component and circulating the layup solution through the degassing system.

The degassing system further includes a degassing assembly for removing a predetermined amount of the undesired gases from the layup solution such that the amount of desired gases within the layup solution remains at or below standard values. The degassing assembly is operatively connected to the intake assembly. The pumping assembly supplies the layup solution to the degassing assembly.

In accordance with the present invention, the degassing assembly includes at least one degassing module for removing the undesired gases from the layup solution under vacuum pressure. Each degassing module preferably includes at least one membrane filter containing a plurality of hollow fibers. Each of the hollow fibers is permeable to the undesired gases, but impermeable to the layup solution.

As such, the undesired gases may pass through the fibers, but the layup solution may not. In a preferred form, the hollow fibers are formed from strands of polymeric material.

The degassing assembly further includes at least one vacuum assembly operatively connected to the degassing modules. The vacuum assembly supplies vacuum pressure to the degassing modules to remove the undesired gas in the layup solution. The undesired gases are drawn through the hollow fibers. The degassing assembly may further include a purification assembly for purifying the layup water solution. The purification assembly may include at least one filter and/or resin bed for purifying the layup water solution.

The degassing system further includes a return assembly for returning the layup solution from the degassing assembly to the power plant component.

In accordance with the present invention, the liquid degassing system may further include at least one gas sensor for measuring the content of the undesired gas within the layup solution within the liquid degassing system.

Furthermore, it is contemplated that the liquid degassing system may include a degassing assembly bypass operatively connected to the intake assembly. When the undesired gas content is below prescribed levels, it may not be necessary for the layup solution to be passed through the degassing assembly. The degassing assembly bypass permits the layup solution withdrawn from the power plant component to be returned directly to the at least one plant component without passing through degassing assembly. A control assembly including at least one valve assembly is provided to operate the bypass during predetermined conditions.

The present invention is also directed to a process of removing undesired gases from a layup solution during a layup operation of a power plant. The process includes removing a supply of layup solution from at least one power plant component. The supply of layup solution is then passed through a degassing assembly to remove a predetermined amount of undesired gases from the layup solution. The supply of layup solution is passed through at least one degassing module. A vacuum pressure is applied to the at least one degassing module to withdraw at least a predetermined amount of undesired gas from the layup solution. The supply of layup solution is the returned to the power plant component.

BRIEF DESCRIPTION OF THE DRAWINGS

The invention will be described in conjunction with the following drawings in which like reference numerals designate like elements and wherein.

DETAILED DESCRIPTION OF PREFERRED EMBODIMENTS

Figure 1:
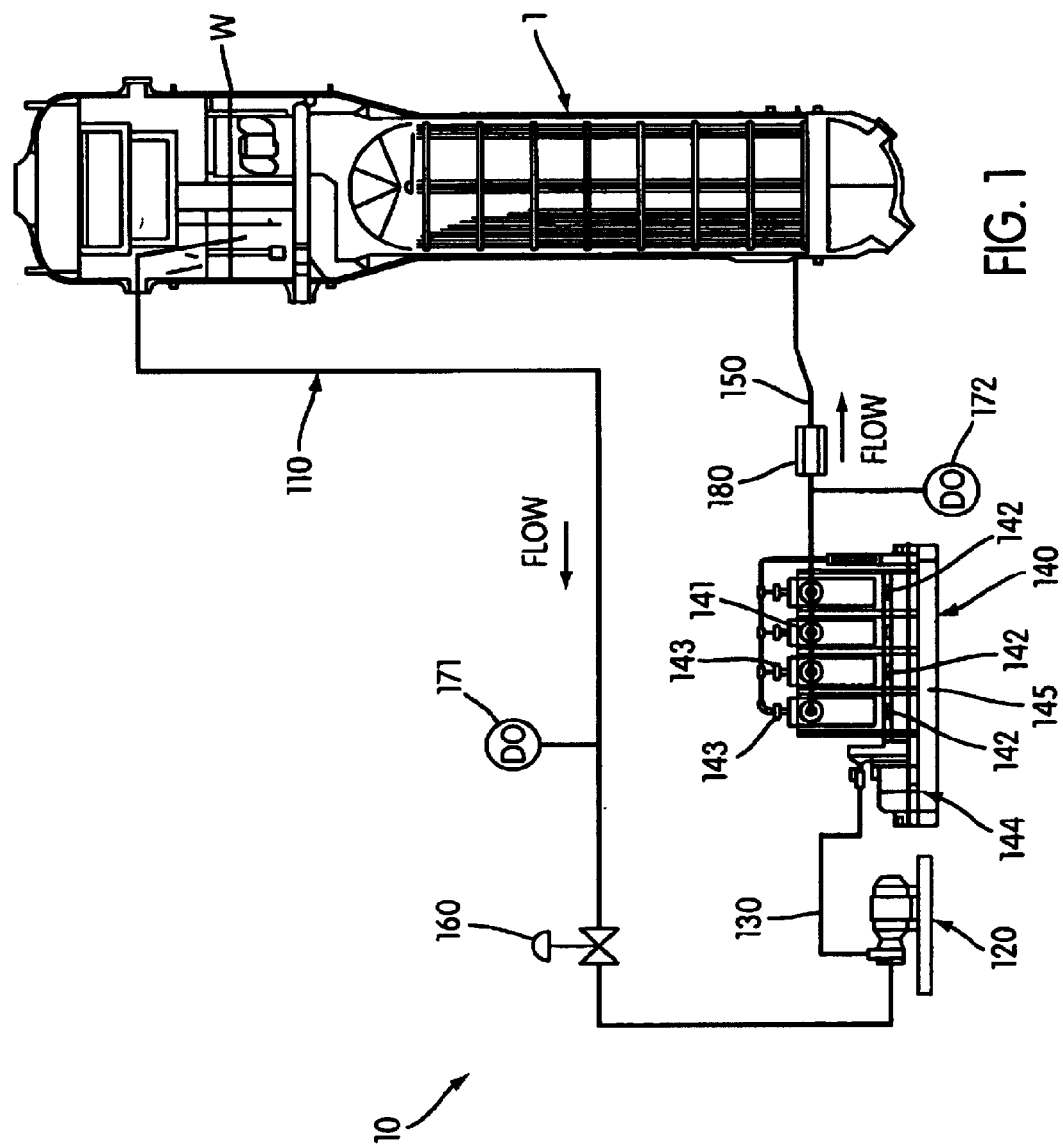
FIG. 1 is a schematic diagram of the layup system in accordance with an embodiment of the present invention.

A degassing layup system 10 in accordance with the present invention for a steam generator 1 is illustrated in FIG. 1. The steam generator 1 is of the type used for the generation of electricity in, for example, a nuclear power plant. It is contemplated that the degassing layup system 10 may be used with steam generators of varying sizes. The volume of the steam generator 1 may vary between 40,000 and 125,000 liters. The steam generator 1 is often 40 to 60 feet tall. The present invention, however, is limited for use with generators 1 within the above-identified range; rather, it is contemplated that the degassing layup system 10 may be used with steam generators having a volume of less than 40,000 liters. It is also contemplated that the degassing layup system 10 may be used with steam generators having a volume of greater than 125,000 liters.

The degassing layup system 10 includes a pipe assembly or hose assembly 110 that is temporarily connected to an upper portion of the steam generator 1 during a layup operation through an upper manway, as shown in FIG. 1. The pipe assembly 110 extends into the interior of the steam generator 1 to a point below the water level W. The pipe assembly 110 is connected a recirculation pump assembly 120. Suction provided by the recirculation pump assembly 120 serves to withdraw layup water from within the interior of the steam generator 1. A hose assembly or pipe assembly 130 extends from the recirculation pump assembly 120 to a degassing skid assembly 140. The degassing skid assembly 140 is considerably smaller than the steam generator 1. The skid assembly 140 may be approximately 6 feet wide, by 3 feet deep by 3 feet tall. The skid assembly 140, however, is not limited to these dimensions. Larger and smaller sized skid assemblies are considered to be well within the scope of the present invention.

The degassing skid assembly 140 includes a plurality of degassing modules 141 and at least one vacuum pump 144. The degassing modules 141 are connected in parallel to the pipe assembly 130. During operation, layup water is pumped through the pipe assembly 130 into the degassing modules 141 by the recirculation pump assembly 120. The layup water is deoxygenated as the water passes through the degassing modules 141. Each degassing module includes a suction valve assembly 142 located on an intake side of the degassing module 141. The suction valve assembly 142 is selectively operable to permit the flow of layup water into the degassing module 141. Each degassing module 141 further includes a discharge valve assembly 143 located on the discharge side of the degassing module 141. The suction valve assembly 142 and the discharge valve assembly 143 can be selectively operated to isolate or turn off one or more degassing modules 141.

In accordance with the present invention, the degassing modules 141 of the degassing skid assembly 140 are connected in parallel. The present invention, however, is not limited to the above-described parallel arrangement; rather, it is contemplated that the plurality of degassing modules 141 may be connected in series. With such an arrangement, a suction valve assembly 142 may be located on the intake side of the first degassing module 141 and a discharge valve assembly 143 may be located on the discharge side of the last degassing module 141. It is further contemplated that the degassing skid assembly 140 may include parallel sets of degassing modules 141 connected in series (i.e., a first set including a plurality of degassing modules connected in series and at least a second set including a plurality of degassing modules, wherein the first and second sets are connected in parallel).

Figure 2:
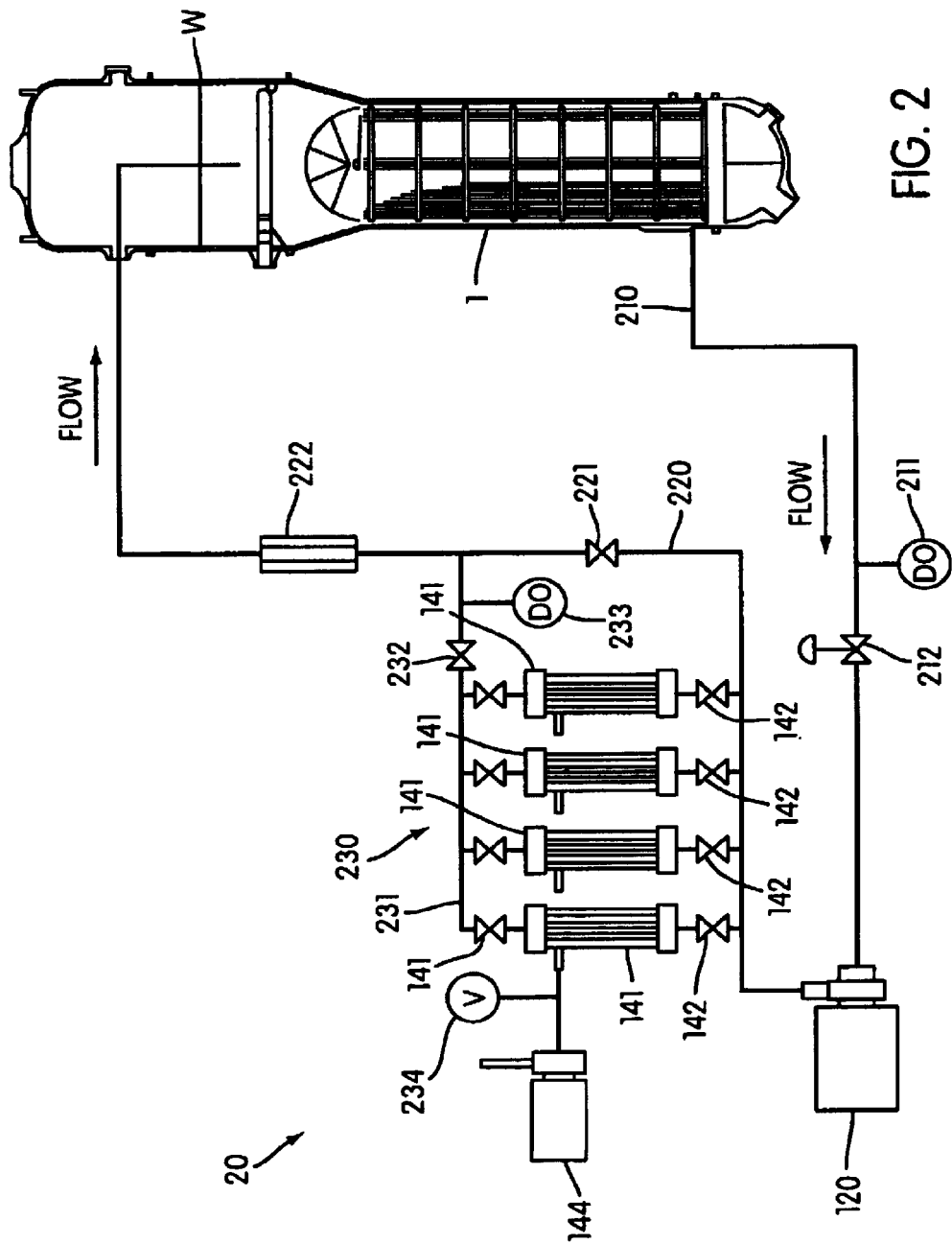
FIG. 2 is a schematic diagram of the layup system in accordance with another of embodiment of the present invention.

Each degassing module 141 incorporates membrane filters. The membrane filters include hollow fibers. The hollow fiber are preferably polymeric strands (typically fabricated from poly-4methylpentene-1), which are permeable to dissolved gases, but impermeable to liquids. During operation, the layup water is pumped through one or more of degassing modules 141. A vacuum from a vacuum pump assembly 144 is applied to each of the degassing modules 141 such that any dissolved gases in the layup water are drawn through the hollow fibers and withdrawn from the degassing modules 141. The vacuum pump assembly 144 preferably includes a liquid ring type vacuum pump. The present invention, however, is not limited to a liquid ring type vacuum pump, other types of vacuum pumps may be used. The level of vacuum required for degassing water from saturation (7 to 8 ppm oxygen) to 50 to 200 ppb oxygen is easily achieved with a commercial liquid ring vacuum pump. Each degassing module 141 is individually connected to the vacuum pump assembly 144, which discharges to atmosphere. The vacuum level is monitored by a vacuum gauge or sensor 234, as shown in FIG. 2. A single vacuum gauge may be employed with the degassing skid assembly 140. The present invention, however, is not limited to the use of a single vacuum gauge; rather, each degassing module 141 may be equipped with a vacuum gauge.

Maintenance of the dissolved oxygen concentration at low levels is achievable as the hollow fibers in the filters greatly increases the available surface area over which the vacuum may be applied. In accordance with the present invention, degassing of a liquid stream may be achieved at high flow rates, up to 100 liters per minute per filter or more. For a typical steam generator 1 with a secondary fill volume of 75,000 liters, four degassing modules 141 operating in parallel leads to a liquid residence time of just over 3 hours. Testing has shown that while the uptake of oxygen in an open, partially filled steam generator is a concern over a period of one to two days, acceptably low levels are maintained after three hours. Consequently, a 3-hour residence time or turnover with freshly de-oxygenated water satisfies the industry guidelines of maintaining low levels of oxygen in the system. It is contemplated that the degassing layup system 10 has a system flowrate of 225 to 500 liters per minute. The undesired gas is continuously or periodically removed from the layup water without extracting or removing the layup chemicals, such as, for example, ammonia, morpholine or DMA. The degassing assembly includes a purification assembly 145 for purifying the layup water solution. The purification assembly 145 may include at least one filter and/or resin bed for purifying the layup water solution. The layup water solution circulates through the purification assembly 145 before it is returned to the steam generator 1.

The layup water exiting the degassing skid assembly 140 is returned to the steam generator 1 through a hose assembly or pipe assembly 150.

It is contemplated that the degassing layup system 10 includes one or more control and/or monitoring assemblies various control instrumentation for monitoring and controlling the operation of the degassing layup system 10. A flow control assembly 160 is provided for controlling and regulating the flow of layup water within the system 10. The flow control assembly 160 may include a control valve. Alternatively, it is also contemplated that the flow of layup water within the system 10 may be controlled by regulating the recirculation pump assembly 120.

The degassing layup system 10 includes one or more oxygen sensor assemblies. A first oxygen sensor assembly 171 is located in the pipe assembly 110 to monitor the oxygen content of the layup water entering the degassing layup system 10 from the steam generator 1. A second oxygen sensor assembly 172 is located in the pipe assembly 150 to monitor the oxygen content of the layup water exiting the degassing system 10.

Furthermore, the degassing layup system 10 includes a flowmeter 180 for monitoring the flow of layup water from the degassing skid assembly 140 into the steam generator 1. The degassing layup system 10 may further include temperature sensors to monitor the temperature of the layup water at various points within the degassing system 10. At least one vacuum sensor is provided to monitor the vacuum pressure within the degassing modules 141.

A degassing layup system 20 in accordance with another embodiment of the present invention for a steam generator 1 will now be described in connection with FIG. 2. The degassing layup system 20 is a variation of the degassing layup system 10. In the layup system 20, layup water is withdrawn from the lower end or bottom of the steam generator 1.

The degassing layup system 20 includes a pipe assembly or hose assembly 210 that is connected to a lower portion of the steam generator 1, as shown in FIG. 2. The pipe assembly 210 is connected a recirculation pump assembly 120. Suction provided by the recirculation pump assembly 120 serves to withdraw layup water from within the interior of the steam generator 1. An oxygen sensor assembly 211 is located in the pipe assembly 210 to monitor the oxygen content of the layup water entering the degassing layup system 20 from the steam generator 1. A flow control assembly 212 is provided in the flow path of the pipe assembly 210 for controlling and regulating the flow of layup water within the system 20. The flow control assembly 212 may include a control valve. As discussed above, it is also contemplated that the flow of layup water may be controlled by regulating the recirculation pump assembly 120.

A hose assembly or pipe assembly 220 extends from the recirculation pump assembly 120. The pipe assembly 220 is operatively connected to a degassing skid assembly 230 and the steam generator 1. With this arrangement, the layup water may be fed from the recirculation pump assembly 120 to the degassing skid assembly 230 or bypass the degassing skid assembly 230 and return directly the steam generator 1. It is contemplated that the layup water may be returned directly to the steam generator 1 when the oxygen sensor 211 senses oxygen content in the layup water below a threshold value.

The degassing skid assembly 230 includes a plurality of degassing modules 141 and at least one vacuum pump 144. As described above in connection with the system 10, the degassing modules 141 are connected in parallel. The layup water is deoxygenated as the water passes through the degassing modules 141. Each degassing module includes a suction valve assembly 142 located on an intake side of the degassing module 141. The suction valve assembly 142 is selectively operable to permit the flow of layup water into the degassing module 141. Each degassing module 141 further includes a discharge valve assembly 143 located on the discharge side of the degassing module 141. The suction valve assembly 142 and the discharge valve assembly 143 can be selectively operated to isolate or turn off one or more degassing modules 141. As described above, the degassing modules 141 may be connected in parallel, series or any combinations thereof.

When it is desired to bypass the degassing modules 141 of the degassing skid assembly 230, the suction valves 142 are closed to prevent layup water from entering the degassing modules 141. A flow control valve assembly 221 located within the pipe assembly 220 is opened to permit the flow of layup water directly to the steam generator 1.

The layup water exiting the degassing skid assembly 230 is returned to the pipe assembly 220 through a hose assembly or pipe assembly 231 whereupon the layup water is returned to the steam generator 1. The pipe assembly 231 includes a valve assembly 232, which prevents the back flow of water into the skid assembly 230 when the layup water bypasses the degassing modules 141. An oxygen sensor assembly 233 is located in the pipe assembly 231 to monitor the oxygen content of the layup water exiting the skid assembly 230. It is also contemplated that the oxygen sensor assembly 233 may be located within the pipe assembly 220.

Furthermore, the degassing layup system 20 includes a flowmeter 222 for monitoring the flow of layup water from the degassing skid assembly 230 into the steam generator 1.

Like the degassing layup system 10, the degassing layup system 20 may further include temperature sensors to monitor the temperature of the layup water at various points within the degassing system 20. At least one vacuum sensor 234 is provided to monitor the vacuum pressure within the degassing modules 141.

The systems 10 and 20 in accordance with the present invention may be used in pressured water reactors and steam generators. In the case of a steam generator, both top to bottom or bottom to top flow can be used, depending upon the plant arrangement. Flow from the top to bottom, as shown in FIG. 2, may have an advantage in that the surface of the water in the steam generator 1 is always being replenished with water at the lowest dissolved oxygen content. This path also provides a greater net positive suction head to the recirculation pump. On the other hand, flow from the bottom to the top, as shown in FIG. 1, results in an upward drift flux of deoxygenated water which occurs at a velocity which is significantly greater than the diffusive flux of oxygen downward from the open surface. In this case, there may be some increased assurance that dissolved oxygen concentration are maintained as low as possible. Of course, a portion of the recirculated flow may also be directed to the steam generator annulus, therefore eliminated one of the limitations of nitrogen sparging which occurs only in the central region of the steam generator through existing blowdown systems.

It will be appreciated that numerous modifications to and departures from the preferred embodiments described above will occur to those having skill in the art. The present invention is not limited to the above-described uses. It is contemplated that the degassing system in accordance with the present invention may be used for the maintenance of layup water quality in other nuclear power plant systems including but not limited for use in connection with condensers, feedwater heater trains, drain tanks and piping systems for use in pressurized water and boiling water reactor type plants. It is also contemplated that the degassing system in accordance with the present invention may be used in connection with the supply of deoxygenated water for electrical generator cooling water systems operated under deoxygenated conditions. Furthermore, it is contemplated that the degassing systems 10 and 20 may incorporate various filters or resin beds for cleanup and purification of the layup water. Although the present invention has been described in connection with the removal of oxygen from the layup water, the present invention is not considered to be limited to removal of oxygen; rather, it is contemplated that other undesired gases, which may have a corrosive impact on the generator 1 and other components of the power plant, may be removed from the layup water using the systems 10 and 20, described above. Thus, it is intended that the present invention covers the modifications and variations of the invention, provided they come within the scope of the appended claims and their equivalents.

What is claimed is:

1. A liquid degassing system in combination with a generator, wherein the liquid degassing system being used during a layup operation of the generator, wherein a supply of layup water is recirculated through the generator during the layup operation, wherein the liquid degassing system removes undesired gases from the supply of layup water, the liquid degassing system comprising:

an intake assembly operatively connected to the generator for removing the layup water from the generator, wherein the intake assembly includes a pumping assembly;

a degassing assembly for removing a predetermined amount of the undesired gases from the layup water, wherein the degassing assembly is operatively connected to the intake assembly whereby the pumping assembly supplies layup water from the intake assembly to the degassing assembly, wherein the degassing assembly comprises at least one degassing module for removing the undesired gases from the layup water under vacuum pressure; and a return assembly "operatively connected to the generator" for returning the layup water from the degassing assembly to the generator.

2. The combination according to claim 1, wherein the at least one degassing module comprises:

at least one membrane filter containing a plurality of hollow fibers, wherein the plurality of hollow fibers are permeable to the undesired gases, wherein the plurality of hollow fibers are impermeable to the layup water.

3. The combination according to claim 2, wherein each of the hollow fibers is formed from a polymeric material.

4. The combination according to claim 1, wherein the degassing assembly further comprises:

at least one vacuum assembly operatively connected to the at least one degassing module, wherein the at least one vacuum assembly supplies vacuum pressure to the at least one degassing module to remove the undesired gas in the layup water within the degassing module.

5. The combination according to claim 4, wherein the at least one degassing module comprises:

at least one membrane filter containing a plurality of hollow fibers, wherein the plurality of hollow fibers are permeable to the undesired gases, wherein the plurality of hollow fibers are impermeable to the layup water; and wherein the at least one vacuum assembly supplies vacuum pressure to the at least one membrane filter such that the undesired gases are drawn through the plurality of hollow fibers.

6. The combination according to claim 1, wherein the degassing assembly includes a plurality of degassing modules, wherein each degassing module comprises:

at least one membrane filter containing a plurality of hollow fibers, wherein the plurality of hollow fibers are permeable to the undesired gases, wherein the plurality of hollow fibers are impermeable to the layup water.

7. The combination according to claim 6, wherein each of the hollow fibers is formed from a polymeric material.

8. The combination according to claim 6, wherein the degassing assembly further comprises:

at least one vacuum assembly operatively connected to the plurality of degassing modules, wherein the at least one vacuum assembly supplies vacuum pressure to the plurality of degassing modules to remove the undesired gas from the layup water, wherein the at least one vacuum assembly supplies vacuum pressure to the at least one membrane filter such that the undesired gases are drawn through the plurality of hollow fibers.

9. The combination according to claim 1, further comprising:

at least one gas sensor for measuring the content of the undesired gas within the layup water within the liquid degassing system.

10. A liquid degassing system for use during a layup operation of a power plant having at least one plant component, wherein a supply of layup water is recirculated through the at least one plant component during the layup operation, wherein the liquid degassing system removes undesired gases from the supply of layup water, the liquid degassing system comprising:

an intake assembly for removing the layup water from the at least one plant component, wherein the intake assembly includes a pumping assembly;

a degassing assembly for removing a predetermined amount of the undesired gases from the layup water, wherein the degassing assembly is operatively connected to the intake assembly whereby the pumping assembly supplies layup water from the intake assembly to the degassing assembly, wherein the degassing assembly comprises at least one degassing module for removing the undesired gases from the layup water under vacuum pressure;

a return assembly for returning the layup water from the degassing assembly to the at least one plant component;

a degassing assembly bypass operatively connected to the intake assembly, whereby the layup water withdrawn from the at least one plant component is returned directly to the at least one plant component without passing through degassing assembly; and a control assembly for selectively operating the degassing assembly bypass during predetermined conditions.

11. A process of removing undesired gases from a layup solution during a layup operation of a power plant, wherein the power plant includes at least one power plant component, comprising:

removing a supply of layup solution from the at least one power plant component;

passing the supply of layup solution through a degassing assembly to remove a predetermined amount of undesired gases from the layup solution, wherein the undesired gases are removed from the layup solution under vacuum pressure; and returning the supply of layup solution to the at least one power plant component.

12. The process of removing undesired gases according to claim 11, wherein passing the supply of layup solution through a degassing assembly comprises:

passing the supply of layup solution through at least one degassing module; and applying vacuum pressure to the at least one degassing module to withdraw at least a predetermined amount of undesired gas from the layup solution.

13. The process of removing undesired gases according to claim 12, wherein each degassing module includes at least one membrane filter containing a plurality of hollow fibers, wherein the plurality of hollow fibers are permeable to the undesired gases, wherein the plurality of hollow fibers are impermeable to the layup water, wherein the vacuum pressure is applied to the plurality of hollow fibers to draw the undesired gases into the plurality of hollow fibers.

14. The process of removing undesired gases according to claim 11, further comprising:

monitoring the content of undesired gases within the layup solution.

15. The liquid degassing system according to claim 10, wherein the at least one degassing module comprises:

at least one membrane filter containing a plurality of hollow fibers, wherein the plurality of hollow fibers are permeable to the undesired gases, wherein the plurality of hollow fibers are impermeable to the layup water.

16. The liquid degassing system according to claim 15, wherein each of the hollow fibers is formed from a polymeric material.

17. The liquid degassing system according to claim 10, wherein the degassing assembly further comprises:

at least one vacuum assembly operatively connected to the at least one degassing module, wherein the at least one vacuum assembly supplies vacuum pressure to the at least one degassing module to remove the undesired gas in the layup water within the degassing module.

18. The liquid degassing system according to claim 17, wherein the at least one degassing module comprises:

at least one membrane filter containing a plurality of hollow fibers, wherein the plurality of hollow fibers are permeable to the undesired gases, wherein the plurality of hollow fibers are impermeable to the layup water; and wherein the at least one vacuum assembly supplies vacuum pressure to the at least one membrane filter such that the undesired gases are drawn through the plurality of hollow fibers.

19. The liquid degassing system according to claim 10, wherein the degassing assembly includes a plurality of degassing modules, wherein each degassing module comprises:

at least one membrane filter containing a plurality of hollow fibers, wherein the plurality of hollow fibers are permeable to the undesired gases, wherein the plurality of hollow fibers are impermeable to the layup water.

20. The liquid degassing system according to claim 19, wherein each of the hollow fibers is formed from a polymeric material.

21. The liquid degassing system according to claim 19, wherein the degassing assembly further comprises:

at least one vacuum assembly operatively connected to the plurality of degassing modules, wherein the at least one vacuum assembly supplies vacuum pressure to the plurality of degassing modules to remove the undesired gas from the layup water, wherein the at least one vacuum assembly supplies vacuum pressure to the at least one membrane filter such that the undesired gases are drawn through the plurality of hollow fibers.

22. The liquid degassing system according to claim 10, further comprising:

at least one gas sensor for measuring the content of the undesired gas within the layup water within the liquid degassing system.

* * * * *